United States Patent [19]

Zirnstein et al.

[11] Patent Number: 5,863,879

[45] Date of Patent: Jan. 26, 1999

[54] DYE TRANSFER INHIBITORS FOR DETERGENTS

[75] Inventors: Michael Zirnstein, Schriesheim; Wolfgang Trieselt; Knut Oppenländer, both of Ludwigshafen; Claudia Nilz, Rodersheim-Gronau; Michael Kröner, Mannheim; Wolfgang Günther, Mettenheim, all of Germany

[73] Assignee: BASF Aktiengesellschaft, Ludwigshafen, Germany

[21] Appl. No.: 722,145

[22] PCT Filed: Apr. 6, 1995

[86] PCT No.: PCT/EP95/01251

§ 371 Date: Oct. 17, 1996

§ 102(e) Date: Oct. 17, 1996

[87] PCT Pub. No.: WO95/29221

PCT Pub. Date: Nov. 2, 1995

[30] Foreign Application Priority Data

Apr. 20, 1994 [DE] Germany .......................... 44 13 720.6

[51] Int. Cl.⁶ ...................................................... C11D 3/37
[52] U.S. Cl. .................. 510/360; 510/361; 510/475; 510/476; 510/499; 525/398; 525/400; 528/220; 528/230; 528/243
[58] Field of Search ...................................... 510/360, 361, 510/475, 476, 499; 525/398, 400; 528/230, 243, 200

[56] References Cited

U.S. PATENT DOCUMENTS 5,086,111  2/1992  Pinschmidt et al. ...................... 525/61
5,185,083  2/1993  Smigo et al. ........................... 210/735

FOREIGN PATENT DOCUMENTS

| 0 461 399 | 12/1991 | European Pat. Off. . |
| 0 552 702 | 7/1993 | European Pat. Off. . |
| 2232353 | 1/1973 | Germany . |
| 2814287 | 10/1979 | Germany . |
| 61-051006 | 3/1986 | Japan . |

*Primary Examiner*—Yogendra N. Gupta
*Assistant Examiner*—Bruck Kifle
*Attorney, Agent, or Firm*—Oblon, Spivak, McClelland, Maier & Neustadt, P.C.

[57] ABSTRACT

The use of polymers which are preparable by reaction of (a) polymers that contain vinylamine units, with (b) compounds that contain aldehyde or keto groups, and optionally (c) NH- and/or OH-containing compounds and which contain aminal, hemiaminal and/or aminal-acetal structures with or without unconverted vinylamine units, as detergent additive for inhibiting dye transfer during the wash, and polymers containing aminal, hemiaminal and/or aminal-acetal structures, obtainable by reaction of (a) polymers that contain vinylamine units, with (b) compounds that contain aldehyde or keto groups, and (c) NH- and/or OH-containing compounds, and detergents which contain the abovementioned polymers in amounts from 0.05 to 10% by weight.

9 Claims, No Drawings

DYE TRANSFER INHIBITORS FOR DETERGENTS

BACKGROUND OF THE INVENTION

1. Field of the Invention

The present invention relates to the use of polymers as detergent additives for inhibiting dye transfer during the wash, to polymers that contain aminal, hemiaminal and/or aminal-acetal structures, and to detergents containing these polymers.

2. Discussion of the Background

DE-B-22 32 353 discloses detergent and cleaner mixtures which consist essentially of 95 to 60% by weight of nonionic detergents and 5 to 40% by weight of a partially or completely water-soluble polyvinylpyrrolidone and are essentially free of anionic surfactants. Polymers of vinylpyrrolidone prevent the transfer of dye from colored to white textiles during the wash. Polymers of vinylpyrrolidone have molecular weights within the range from about 10 000 to about 1 000 000. Both homopolymers and copolymers of vinylpyrrolidone are suitable. Acrylonitrile and maleic anhydride are mentioned as suitable comonomers. However, the effectiveness of vinylpyrrolidone polymer dye transfer inhibitors is strongly impaired by anionic surfactants.

DE-A-28 14 287 discloses detergent and cleaner compositions containing anionic and/or nonionic surfactants, builders and other customary detergent additives and also—as discoloration-inhibiting additives—from 0.1 to 10% by weight of water-soluble or water-dispersible homo- or copolymers of N-vinylimidazole. These polymers, however, are insufficiently active against a number of color stains.

EP-A-0 461 399 and EP-A-0 552 702 disclose polymers which contain aminal and acetal-aminal groups and which are prepared by reacting polyvinylamines or copolymers which contain vinylamine and vinyl alcohol units with aldehydes. These polymers are used as flocculants or as retention aids in papermaking.

JP-A-61/051006 discloses particulate crosslinked polyvinylamines prepared by reaction of polyvinylamines with crosslinkers, such as alkylene dihalides, epichlorohydrin or dialdehydes. The crosslinked polyvinylamines are used as ion exchangers.

SUMMARY OF THE INVENTION

It is an object of the present invention to provide a detergent additive which, compared with known dye transfer inhibitors, shows improved effectiveness. It is a further object to provide novel compounds.

We have found that the first object is achieved by using polymers which are prepared by reaction of (a) polymers that contain vinylamine units, with (b) compounds that contain aldehyde or keto groups, and optionally (c) other NH- and/or OH-containing compounds and which contain aminal, hemiaminal and/or aminal-acetal structures with or without unconverted vinylamine units, as detergent additive for inhibiting dye transfer during the wash.

We have found that the other object is achieved by polymers containing aminal, hemiaminal and/or aminal-acetal structures, obtainable by reaction of (a) polymers that contain vinylamine units, with (b) compounds that contain aldehyde or keto groups, and optionally (c) other NH- and/or OH-containing compounds.

The present invention further provides detergents based on surfactants with or without builders and other customary constituents, containing from 0.05 to 10% by weight of polymers which are preparable by reaction of (a) polymers that contain vinylamine units, with (b) compounds that contain aldehyde or keto groups, and optionally (c) other NH- and/or OH-containing compounds and which contain aminal, hemiaminal and/or aminal-acetal structures with or without unconverted vinylamine units.

DETAILED DESCRIPTION OF THE PREFERRED EMBODIMENTS

The polymers to be used according to the invention as dye transfer inhibitors in detergents are at least partly known from the prior art; cf. the above-cited references EP-A-0 461 399, EP-A-0 552702 and JP-A-61/051006. They are prepared starting from polymers containing vinylamine units. These polymers can be either homopolymers or copolymers. The polymers with vinylamine units are usually prepared by polymerizing open-chain N-vinylcarboxamides of the formula I

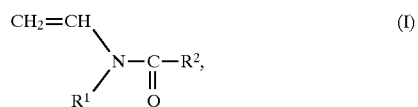

where $R^1$ and $R^2$ are each H or $C_1$–$C_6$-alkyl, and subsequent partial or complete elimination of the group

by heating with acids or bases. Partial elimination of the groups

from the polymers gives polymers (a) with randomly distributed units of the structure

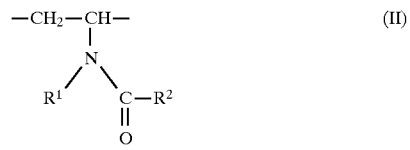

and

where the substituents $R^1$ and $R^2$ can be identical or different and each is H or $C_1$–$C_6$-alkyl. $R^1$ and $R^2$ are preferably H; that is, the preferred open-chain N-vinylcarboxamide is N-vinylformamide. Such polymers are known for example from EP-B-0 071 050.

The proportion of units III in the polymers ranges from 0.1 to 100 mol %.

As well as the hydrolyzed homopolymers of compounds of the formula I, component (a) comprises hydrolyzed copolymers of amides of the formula I and of other monoethylenically unsaturated monomers. Such polymers contain (1) from 0.1 to 100 mol % of vinylamine units and
(2) from 99.9 to 0 mol % of units of other monoethylenically unsaturated monomers and
(3) from 0 to 5 mol % of units of monomers having at least two ethylenically unsaturated nonconjugated double bonds.

Suitable copolymers (a) contain for example, as other monoethylenically unsaturated monomers, vinyl esters of saturated carboxylic acids having from 1 to 6 carbon atoms, eg. vinyl acetate, vinyl propionate and vinyl butyrate, monoethylenically unsaturated $C_3$–$C_8$-carboxylic acids, such as acrylic acid, methacrylic acid, dimethylacrylic acid, ethacrylic acid, crotonic acid, vinylacetic acid, allylacetic acid, maleic acid, fumaric acid, citraconic acid and itaconic acid and also their esters, anhydrides, amides and nitriles. Preferably used anhydrides include for example maleic anhydride, citraconic anhydride and itaconic anhydride. Suitable esters are derived for example from alcohols having 1 to 6 carbon atoms, such as methyl acrylate, methyl methacrylate, ethyl acrylate, ethyl methacrylate, isobutyl acrylate or hexyl acrylate, or from glycols or polyalkylene glycols, in each case only one OH group of the glycols or polyglycols being esterified with a monoethylenically unsaturated carboxylic acid, eg. hydroxyethyl acrylate, hydroxyethyl methacrylate, hydroxypropyl acrylate, hydroxypropyl methacrylate, hydroxybutyl acrylate, hydroxybutyl methacrylate and also acrylic monoesters of polyalkylene glycols having a molecular weight of up to 10,000, preferably from 1,500 to 9,000. It is also possible to use esters of the carboxylic acids mentioned with aminoalcohols, eg. dimethylaminoethyl acrylate, dimethylaminoethyl methacrylate, diethylaminoethyl acrylate, diethylaminoethyl methacrylate, dimethylaminopropyl acrylate and dimethylaminopropyl methacrylate. Suitable amides include for example acrylamide, methacrylamide, and also N-alkyl- and N-dialkyl-amides having alkyl radicals from 1 to 6 carbon atoms, eg. N-methylacrylamide, N,N-dimethylacrylamide, N-methylmethacrylamide, N-ethylacrylamide, N-propylacrylamide and tert-butylacrylamide and also basic amides such as dimethylaminoethylacrylamide, dimethylaminoethylmethacrylamide, diethylaminoethylmethacrylamide, diethylaminoethylacrylamide, dimethylaminopropylacrylamide, diethylaminopropylacrylamide, diethylaminopropylmethacrylamide and dimethylaminopropylmethacrylamide. The basic acrylates and acrylamides can be used in the form of the free bases, in the form of the salts with mineral acids or carboxylic acids or else in quaternized form. Suitable comonomers also include acrylonitrile, methacrylonitrile, N-vinylpyrrolidone, N-vinylcaprolactam, N-vinylimidazole and also substituted N-imidazoles such as N-vinyl-2-methylimidazole and N-vinyl-2-ethylimidazole and N-vinylimidazoline and substituted N-vinylimidazolines, e.g. N-vinyl-2-methylimidazoline. In addition to the comonomers mentioned it is also possible to use sulfo-containing monomers, for example vinylsultonic acid, allylsulfonic acid, styrenesulfonic acid and 3-sulfopropyl acrylate, as other monoethylenically unsaturated monomers. The vinylamine polymers (a) preferably contain (1) from 1 to 99 mol % of vinylamine units and
(2) from 99 to 1 mol % of units of monomers selected from the group consisting of open-chain N-vinylcarboxamides, vinyl formate, vinyl acetate, vinyl propionate, $C_1$–$C_6$-alkyl vinyl ethers, vinylureas, acrylic acid, methacrylic acid, maleic acid and the anhydrides, esters, nitriles and amides of said carboxylic acids, N-vinylpyrrolidone, N-vinylimidazoles, N-vinylimidazolines and/or vinyl alcohol units.

These hydrolyzed copolymers are known for example from EP-B-0 216 387, EP-B-0 251 182 and EP-A-0 582 409. The preferred vinylamine polymers (a) contain (1) from 0.1 to 100 mol % of vinylamine units and
(2) from 99.9 to 0 mol % of N-vinylformamide, vinyl formate, vinyl acetate and/or vinyl alcohol units.

They are obtainable by homopolymerization of compounds of the formula I and subsequent complete elimination of the group —CO—$R^2$ or by copolymerization of N-vinylformamide and vinyl acetate and subsequent partial or complete elimination of formyl groups from the polymer and partial or complete hydrolysis of the copolymerized vinyl formate or vinyl acetate units to give vinyl alcohol units.

The vinylamine polymers (a) can be modified by copolymerizing monomer mixtures which contain up to 5 mol % of a monomer which contains at least two ethylenically unsaturated nonconjugated double bonds in the molecule. This produces crosslinked copolymers which contain up to 5 mol % of units of monomers having at least two ethylenically unsaturated nonconjugated double bonds in the molecule. If crosslinkers are used in the copolymerization, the preferred amount ranges from 0.05 to 2 mol %. The use of the monomers (3) serves to increase the molecular weight of the copolymers. Suitable compounds of this kind include for example methylene bisacrylamide, esters of acrylic acid or methacrylic acid with polyhydric alcohols, eg. glycol dimethacrylate or glycerol trimethacrylate, and also at least doubly acrylated or methacrylated polyols, such as pentaerythritol and glucose. Suitable crosslinkers also include divinylethyleneurea, divinylbenzene, divinyldioxane, pentaerythritol triallyl ether and pentaallyl sucrose. Preference is given to selecting from this group of compounds water-soluble monomers, for example glycol diacrylate or glycol diacrylates or glycol dimethacrylates of polyethylene glycols having a molecular weight of up to 3,000.

The copolymers have K values from 10 to 300, preferably from 20 to 200. The K values are determined by the method of H. Fikentscher in 5% strength aqueous sodium chloride solution at pH 7 and a temperature of 25° C. using a polymer concentration of 0.1% by weight.

The hydrolyzed copolymers may contain from 0 to 50 mol % of acetate units, from 0 to 99 mol % of alcohol units and/or from 0 to 99.9 mol % of N-vinylformamide units.

The vinylamine polymers (a) are reacted with (b) compounds containing aldehyde or keto groups. Suitable for use as component (b) are all compounds which contain at least one of the following carbonyl functions capable according to the state of the art of the formation of aminals or acetals. These functional groups are present for example in monoaldehydes, dialdehydes, hydroxyaldehydes, alkoxyaldehydes, ketoaldehydes, aldehydecarboxylic acids, aldehydecarboxylic esters, aldehydecarboxamides, ketones, hydroxyketones and/or alkoxyketones.

Suitable for use as component (b) are for example monoaldehydes such as formaldehyde, acetaldehyde, propionaldehyde, n-butyraldehyde, isobutyraldehyde, 2-methylbutanal, 3-methylbutanal, pentanal, hexanal and 2-methylpentanal, unsaturated aldehydes such as acrolein, crotonaldehyde and propargylaldehyde, hydroxyaldehydes and alkoxyaldehydes such as hydroxyacetaldehyde, methoxyacetaldehyde, 2-hydroxypropionaldehyde, 3-hydroxypropionaldehyde, 4-hydroxybutanal, 5-hydroxypentanal, glycerolaldehyde and other hydroxyaldehydes and alkoxyaldehydes, ketoaldehydes such as methylglyoxal and aldehydecarboxylic acids and their esters such as glyoxalic acid, 2-formylpropionic acid, methyl 2-formylpropionate, 3-formylpropionic acid, methyl 3-formylpropionate, 2-formyl-2-methylpropionic acid, methyl 2-formyl-2-methylpropionate, 4-oxobutyric acid and methyl 4-oxobutyrate. Suitable dialdehydes include for example glyoxal, malonaldehyde, succinaldehyde, glutaraldehyde, 3-oxo-glutaraldehyde, hexanedial, heptanedial and octanedial. It is also possible to use aromatic aldehydes such as benzaldehyde, 2-methylbenzaldehyde, 4-methylbenzaldehyde, 2-methoxybenzaldehyde, 4-methoxybenzaldehyde, 4-ethoxybenzaldehyde, 4-dimethylaminobenzaldehyde, 4-diethylaminobenzaldehyde, phthalic dicarboxaldehyde and terephthaldicarboxaldehyde.

Also possible are carbohydrates such as glucose, mannose and arabinose and also starch hydrolysates.

Further suitable compounds (b) include ketones such as acetone, methyl ethyl ketone, methyl propyl ketone, diethyl ketone, cyclopentanone and cyclohexanone, hydroxyketones and alkoxyketones such as hydroxyacetone and methoxy ketone, diketones such as acetylacetone and acetonylacetone, araliphatic ketones such as acetophenone, 4-hydroxyacetophenone, 2-hydroxyacetophenone, 4-hydroxypropiophenone and 2-hydroxypropiophenone.

Also suitable for use as component (b) are acetals, hemiacetals, aminals and hemiaminals of the abovementioned carbonyl compounds and where appropriate, as in the case of the hydroxyaldehyde, the dimeric form or, as in the case of formaldehyde, the trimeric form and the corresponding oligomers and polymers.

Suitable for use as component (c) are compounds which are different than the polymers (a) and which contain at least one of the following amino or hydroxyl groups capable according to the state of the art of the formation of aminals and acetals. NH-containing compounds (c) include ammonia, amines, etheramines, amino alcohols, aminoetheralcohols, carboxamides, carboximides, urea, urea derivatives, NH-containing heterocycles and suitable OH-containing compounds are alcohols, ether alcohols and polyalkylene glycols.

Examples of compounds suitable for use as component (c) include ammonia, monoalkylamines such as methylamine, ethylamine, 1-propylamine, 2-propylamine, 1-butylamine, 2-butylamine, 2-methylpropylamine, tert-butylamine, 2-methyl-2-propylamine, 3-methylbutylamine, n-pentylamine, 3-methyl-2-butylamine, n-hexylamine, cyclopropylamine, cyclopentylamine, cyclohexylamine, 1,5-dimethylhexylamine, benzylamine, 4-methoxybenzylamine, N-methylbenzylamine, 1-phenylethylamine, 1-methyl-3-phenylpropylamine, dialkylamines such as dimethylamine, n-methylethylamine, diethylamine, N-methylpropylamine, N-ethylpropylamine, N-ethylisopropylamine, dipropylamine, diisopropylamine, dibutylamine, di-sec-butylamine, diisobutylamine, N-methylbutylamine, N-ethylbutylamine, methylcyclohexylamine, ethylcyclohexylamine, 2-phenylethylamine, 2-methyloxyphenylethylamine, 4-rnethoxyphenylethylamine, 3,4-dimethcoxyphenylethylamine and other substituted amines.

Also suitable are diamines such as 1,2-diaminoethane, N-methyl-1,2-diaminoethane, N,N-dimethyl-1,2-diaminoethane, N,N'-dimethyl-1,2-diaminoethane, N,N,N'-trimethyl-1,2-diaminoethane, N-ethyl-1,2-diaminoethane, N,N-diethyl-1,2-diaminoethane, N,N'-diethyl-1,2-diaminoethane, N,N-dipropyl-1,2-ethanamine, N,N,N'-triethyl-1,2-diaminoethane, N-methyl-N-ethyl-1,2-diaminoethane, N-methyl-N'-ethyl-1,2-diaminoethane, N,N-dimethyl-N'-ethyl-1,2-diaminoethane, N,N'-dimethyl-N-ethyl-1,2-diaminoethane, N-propyl-1,2-diaminoethane, N,N-dipropyl-1,2-diaminoethane, N,N'-dipropyl-1,2-diaminoethane, N,N,N'-tripropyl-1,2-diaminoethane, N-isopropyl-1,2-diaminoethane, N,N-diisopropyl-1,2-diaminoethane, N,N'-diisopropyl-1,2-diaminoethane, N,N,N'-triisopropyl-1,2-diaminoethane, N-butyl-1,2-diaminoethane, N,N-dibutyl-1,2-diaminoethane, N,N'-dibutyl-1,2-diaminoethane, N,N,N'-tributyl-1,2-diaminoethane, 1,3-diaminopropane, N-methyl-1,3-diaminopropane, N,N'-dimethyl-1,3-diaminopropane, N,N-dimethyl-1,3-diaminopropane, N,N-diethyl-1,3-diaminopropane, N-ethyl-1,3-diaminopropane, N-isopropyl-1,3-diaminopropane, N-propyl-1,3-diaminopropane, N-butyl-1,3-diaminopropane, N-cyclohexyl-1,3-diaminopropane, 1,2-diaminopropane, N,N-dimethyl-1,2-diaminopropane, 1,4-diaminobutane, 1,2-diaminobutane, 1,3-diaminobutane, 1-diethylamino-4-aminopentane, 1,5-diaminopentane, neopentanediamine, dimethylneopentanediamine and 1,6-diaminohexane, aromatic mono- and diamines such as aniline and o-phenylenediamine, triamines such as diethylenetriamine, N-methyldiethylenetriamine, N-ethyldiethylenetriamine, N-propyldiethylenetriamine, N-butyldiethylenetriamine, N'-methyldiethylenetriamine, N'-ethyldiethylenetriamine, N'-propyldiethylenetriamine, N'-butyldiethylenetriamine, N,N-dimethyldiethylenetriamine, N-methyl-N-ethyldiethylenetriamine, N-methyl-N-propyldiethylenetriamine, N,N-diethyldiethylenetriamine, N-ethyl-N-propyldiethylenetriamine, N,N-dipropyldiethylenetriamine, N,N-dibutyldiethylenetriamine, N,N'-dimethyldiethylenetriamine, N-methyl-N'-ethyldiethylenetriamine, N-ethyl-N'-methyldiethylenetriamine, N-methyl-N'-propyldiethylenetriamine, N-propyl-N'-methyldiethylenetriamine, N,N'-diethyldiethylenetriamine, N,N'-dipropyldiethylenetriamine, N,N'-dibutyldiethylenetriamine, N,N''-dimethyldiethylenetriamine, N-methyl-N''-ethyldiethylenetriamine, N-ethyl-N''-methyldiethylenetriamine, N-methyl-N''-propyldiethylenetriamine, N,N''-diethyldiethylenetriamine, N,N''-dipropyldiethylenetriamine, N,N''-dibutyldiethylenetriamine, N,N,N'-trimethyldiethylenetriamine, N,N-dimethyl-N'-ethyldiethylenetriamine, N,N'-dimethyl-N-ethyldiethylenetriamine, N,N,N'-triethyldiethylenetriamine, N,N-diethyl-N'-methyldiethylenetriamine, N,N-dipropyl-N'-methyldiethylenetriamine, N,N-dibutyl-N'-methyldiethylenetriamine, N,N,N''-triethyldiethylenetriamine, N,N-dimethyl-N''-ethyldiethylenetriamine, N,N'-dimethyl-N''-ethyldiethylenetriamine, N,N,N''-triethyldiethylenetriamine, N,N-diethyl-N''-methyldiethylenetriamine, N,N-dipropyl-N''-methyldiethylenetriamine, N,N-dibutyl-N''-methyldiethylenetriamine, N,N,N',N''-tetramethyldiethylenetriamine, N,N,N'',N''-tetramethyldiethylenetriamine, N,N,N',N''-tetraethyldiethylenetriamine, N,N,N'',N''-tetraethyldiethylenetriamine, N-(2-aminoethyl)-1,3-diaminopropane, dipropylenetriamine, hexamethylenetriamine, N,N-dimethyldipropylenetriamine and other triamines, tetramines such as N,N'-bis (aminopropyl)ethylenediamine, N,N'-bis(aminoethyl) ethylenediamine, N,N'-bis(aminoethyl)-1,3-diaminopropane and Polyamines such as polymers of ethyleneimine which are preparable for example by polymerization of ethyleneimine with alkylene halides or acids as catalyst.

Also suitable for use as component (c) are residues from amine distillations such as, for example, the distillation of diethylenetriamine and of other abovementioned amines and also etheramines such as 2-methoxyethylamine, 2-ethoxyethylamine, 1-methoxy-2-aminopropane, 3-methoxypropylamine, 2-methoxy-1-aminopropane, 3-ethoxypropylamine, di-2-methoxyethylamine, 3-(2-methoxyethoxy)propylamine, 4,7-dioxadecane-1,10-diamine, 4,9-dioxadecane-1,12-diamine, 4,11-dioxatetradecane-1,14-diamine, 4,7,10-trioxadecane-1,13-diamine and other etherdiamines, amino ether alcohols such as 2-(2-aminoethoxy)ethanol, 2-[2-(dimethylamino)ethoxy] ethanol, 2-[2-(diethylamino)ethoxy]ethanol, 3-(diethylamino)-1,2-propanediol and other amino ether alcohols, amino alcohols such as 2-aminoethanol, 2-methylaminoethanol, 2-dimethylamino-ethanol, 2-(ethylamino)ethanol, 2-diethylaminoethanol, diisopropylethanolamine, 2-amino-1-propanol, 1-amino-2-propanol, 3-amino-1-propanol, 3-(dimethylamino)-1-propanol, 1-(ethylamino)-2-propanol, 2-(2-dimethylaminoethoxy)ethanol, bis(2-hydroxyethyl)amine, tris(2-hydroxyethyl)amine, bis(2-hydroxypropyl)amine, tris (2-hydroxypropyl)amine, 2-(butylamino)ethanol, 2-(cyclohexylamino)ethanol, 2-(dibutylamino)ethanol, tert-butylethanolamine, tert-butyldiethanolamine, methyldiethanolamine, butyldiethanolamine, dimethylisopropanolamine, methyldiisopropanolamine, N-(2-hydroxyethyl)-1,2-diaminoethane, N,N-bis(2-hydroxyethyl)-1,2-diaminoethane, N,N'-bis(2-hydroxyethyl)-1,2-diaminoethane, N,N,N'-tris(2-hydroxyethyl)-1,2-diamino ethane, N,N,N',N'-tetrakis(2-hydroxyethyl)-1,2-diaminoethane, N-(2-hydroxyethyl)-1,2-diaminopropane, N,N-bis-(2-hydroxyethyl)-1,2-diaminopropane, N,N'-bis(2-hydroxyethyl)-1,2-diaminopropane, N,N,N'-tris(2-hydroxyethyl)-1,2-diaminopropane, N,N,N',N'-tetrakis(2-hydroxyethyl)-1,2-diaminopropane, N-(2-hydroxyethyl)-1,3-diaminopropane, N,N-bis(2-hydroxyethyl)-1,3-diaminopropane, N,N'-bis(2-hydroxyethyl)-1,3-diaminopropane, N,N,N'-tris(2-hydroxyethyl)-1,3-diaminopropane, N,N,N',N'-tetrakis(2-hydroxyethyl)-1,3-diaminopropane, 3-amino-2,2-dimethyl-1-propanol, 3-dimethylamino-2,2-dimethyl-1-propanol, 3-(2-hydroxyethylamino)-1-propanol, 2-amino-1-butanol, 2-dimethylamino-1-butanol and 2-[(aminoethyl) amino] ethanol.

Of course, also suitable for use as component (c) are mixtures of the compounds mentioned for a group or of two or more different groups.

Further suitable compounds (c) include carboxamides such as formamide, acetamide, propionamide, butyramide, pentanoamide, hexanoamide and benzoamide, mono- and diamides of dicarboxylic acids such as oxalamide, malonamide, succinamide, maleamide, glutaramide and adipamide, imides of dicarboxylic acids such as succinimide, maleimide, glutarimide and phthalimide, urea and substituted ureas such as N-methylurea, N,N-dimethylurea, N,N,N'-trimethylurea, ethyleneurea, propyleneurea, N-methylethyleneurea, N-methylpropyleneurea, N-ethylethyleneurea, N-ethylpropyleneurea, N-aminoethylethyleneurea, N-aminopropylethyleneurea and N-hydroxyethylethyleneurea, N-containing heterocycles such as aziridine, pyrrolidine, pyrrole, pyrazole, imidazole, 1,2,3-triazole, 1,2,4-triazole, oxazolane, pyrrolidone, 2-oxazolidone, piperidine, piperazine, morpholine, 1,4-thiazine, 2-pyridone, 4-pyridone, 2,5-piperazinedione, caprolactam, indole and benzimidazole, aminoalkyl and hydroxyalkyl heterocycles such as N-(2-aminoethyl) pyrrolidine, N-(3-aminopropyl)pyrrolidine, N-(2-aminoethyl)imidazole, N-(3-aminopropyl)imidazole, N-(2-hydroxyethyl)imidazole, N-(2-hydroxyethyl)pyrrolidone, aminoethylpiperazine, N-aminopropylpiperazine, N-aminoethyl-N'-methylpiperazine, N-aminopropyl-N'-methylpiperazine, hydroxyethylpiperazine, hydroxyethylmorpholine, aminoethylmorpholine and other aminoalkyl or hydroxyalkyl heterocycles.

Suitable OH-containing compounds include monohydric and polyhydric alcohols such as methanol, ethanol, 1-propanol, 1-butanol, 2-butanol, pentanol, hexanol, 3-methyl-3-pentanol, cyclohexanol, benzyl alcohol, 4-methylbenzyl alcohol and 2-(4-methoxyphenyl)ethanol, ether alcohols such as 1-butoxy-2-propanol and 1-methoxy-2-butanol, dialcohols such as 1,2-dihydroxyethane, 1,2-dihydroxypropane, 1,3-dihydroxypropane, 1,2-butanediol, 1,3-butanediol, 1,4-butanediol and 2,3-butanediol, trialcohols such as glycerol and 2-(hydroxymethyl)-1,4-butanediol.

To prepare the color transfer inhibitors to be used according to the invention, the components (a) and (b) can be added together or reacted in any desired order. For instance, the vinylamine polymer (a) can be introduced as initial charge, preferably in the form of an aqueous solution, and the carbonyl component (b) gradually added, if desired in the form of a preferably aqueous solution, at a suitable reaction temperature with mixing. The carbonyl component (b) can be added either as such or in the form of the corresponding acetals, hemiacetals, aminals or hemiaminals or, where appropriate, in dimeric or polymeric form.

It is also possible to reverse the order by introducing component (b) as initial charge, preferably in the form of an aqueous solution, and adding a solution of component (a). However, it is also possible to prepare a solution of the components (a) and (b) and to heat it to the suitable reaction temperature with stirring. Similarly, if all three components (a), (b) and (c) are involved, they can be added together or reacted in any desired order. For instance, components (b) and (c) can be reacted in the first step and component (a) be added for the second reaction step. It is also possible to mix aqueous solutions of the components (a) and (c) and then to add component (b), or the other way round. The reactions are preferably carried out in water as solvent. However, it is also possible to use other, preferably water-miscible solvents such as lower alcohols, (poly)ethers or ether alcohols or solvent mixtures which have adequate solvent power for the individual components. Solvent components with hydroxyl groups can of course participate in the reaction through aminal-acetal formation. Instead of in solution, the reactions can also take place in suspension or in a water-in-oil emulsion using a water-immiscible solvent with or without a suitable emulsifier. Suitable reaction temperatures range for example from 10° C. to 120° C., preferably from 30° C. to 80° C. The reaction time is for example from 10 minutes to 10 hours, preferably from 20 minutes to 5 hours.

As well as using no catalyst, it is possible to use an acid catalyst. Suitable for this purpose are mineral acids such as hydrochloric acid, sulfuric acid, perchloric acid, hypophosphorous acid, phosphorous acid and phosphoric acid and also organic acids such as arylsulfonic acids, methanesulfonic acid, formic acid, acetic acid or haloacetic acids. The acids can be added as catalysts in concentrations from 0.005% by weight to 80% by weight, preferably from 1 to 5% by weight, based on the vinylamine component (a). After the reaction has ended, the acid can be neutralized by addition of bases, preferably alkalis. The reaction products can be used either in the form of a solution or in the form of a suspension or, after removal of the solvent, as appropriate by distillation under reduced pressure, spray-drying or freeze-drying, in solid form.

Polymers with aminal, hemiaminal and/or aminal-acetal structures which are obtainable by reaction of (a) polymers that contain vinylamine units, with (b) compounds that contain aldehyde or keto groups, and (c) other NH- and/or OH-containing compounds are novel products. Preference is given to those polymers which are obtainable by reaction of (a) polymers which contain
   (1) from 0.1 to 100 mol % of vinylamine units and
   (2) from 99.9 to 0 mol % of units of monomers selected from the group consisting of open-chain N-vinylcarboxamides, vinyl formate, vinyl acetate, vinyl propionate, $C_1$–$C_6$-alkyl vinyl ethers, vinylureas, acrylic acid, methacrylic acid, maleic acid and the anhydrides, esters, nitriles and amides of said carboxylic acids, N-vinylpyrrolidone, N-vinylimidazoles, N-vinylimidazolines and/or vinyl alcohol units, with (b) aldehydes having from 1 to 5 carbon atoms and (c) ammonia, ethanolamine, ethylenediamine and/or N-(3-aminopropyl)imidazole.

The vinylamine units in the polymers (a) can have been reacted with the compounds (b) and/or (c) in a proportion from 0.1 to 100%, preferably from 1 to 80%. The polymers to be used according to the invention contain at least one of the following structures, starting for example from a completely hydrolyzed polyvinylformamide as (a), formaldehyde as (b) and ammonia as (c):

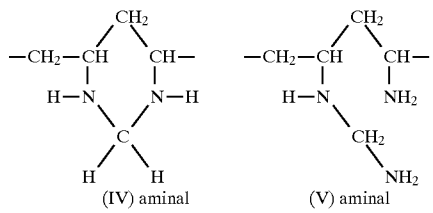
(IV) aminal          (V) aminal

Omitting the component (c) gives for example

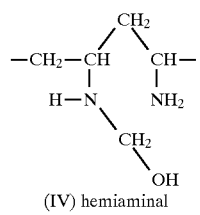
(IV) hemiaminal

Hemiaminal structures are also produced on starting from a copolymer as (a) which contains vinylamine and vinyl alcohol units, for example

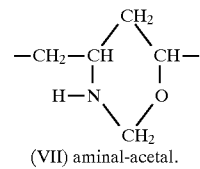
(VII) aminal-acetal.

If the above-described reaction is carried out for example in the presence of ammonia, the following aminal-acetal structure can be produced:

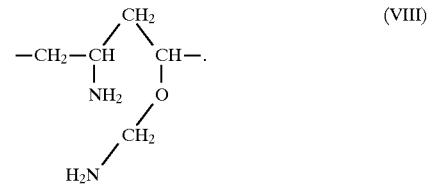

The above-described polymers with aminal, hemiaminal and/or mixed aminal-acetal structures have a viscosity from preferably 1 to 2000 mPas in 3% strength by weight aqueous solution at 25° C. They are used as detergent additives for inhibiting the transfer of dye during the wash. The detergents can be pulverulent or else liquid. The compositions of detergent formulations can differ very widely. Detergents and cleaners customarily contain from 2 to 50% by weight of surfactants with or without builders. This is true not only of liquid but also of pulverulent detergents. Detergent and cleaner formulations which are customary in Europe, in the USA and in Japan are depicted in table form for example in Chemical and Engn. News 67 (1989), 35. Further details about the compositions of detergents and cleaners can be found in WO-A-90/13581 and Ullmann's Encyklopädie der technischen Chemie, Verlag Chemie, Weinheim 1983, 4th Edition, pages 63 to 160. The detergents may additionally contain a bleaching agent, for example sodium perborate, which if used can be present in the detergent formulation in amounts of up to 30% by weight. The detergents may additionally contain further customary additives such as complexing aids, opacifiers, optical brighteners, enzymes, perfume oils, other color transfer inhibitors, grayness inhibitors and/or bleach activators. Detergents based on surfactants with or without builders and other customary constituents contain the polymers to be used according to the invention in amounts from 0.05 to 10, preferably from 0.25 to 5, % by weight.

The aminal, hemiaminal and/or mixed aminal-acetal polymers of the invention act as color transfer inhibitor during the wash and so prevent any staining of white textile material when washed together with dyed textiles.

The present invention therefore provides detergents based on surfactants with or without builders and other customary constituents, containing from 0.05 to 10% by weight of polymers which are preparable by reaction of (a) polymers that contain vinylamine units, with (b) compounds that contain aldehyde or keto groups, and optionally (c) other NH- and/or OH-containing compounds and which contain aminal, hemiaminal and/or aminal-acetal structures with or without unconverted vinylamine units.

The K values were determined by the method of H. Fikentscher, Cellulose-Chemie 13 (1932), 58–64, 71–74, in 5% strength by weight aqueous sodium chloride solution at pH 7 at 25° C. on a polymer concentration of 0.1% by weight.

The polyvinylamines used were obtained by hydrolysis of polyvinylformamides having a K value of 31. The viscosities of the products obtained were determined by means of a VT 500 rotary viscometer from Haake using the measuring device NV (DIN 54 453). Unless otherwise stated, the measurement was carried out at 25° C. with a constant shear rate of 600 s$^{-1}$. Percentages are by weight.

Preparing the polymers

EXAMPLE 1

A flask equipped with stirrer, thermometer and dropping tunnel was charged with 62.5 g of N-(3-aminopropyl) imidazole. The contents were heated to 50° C., and 49.3 g of 36.5% strength aqueous formaldehyde solution were added dropwise over 2 hours, and the mixture was subsequently stirred at 50° C. for 45 minutes.

Then 71.8 g of aqueous polyvinylamine solution (amine number: 6.96 mmol/g) were added dropwise over 1.5 hours. In the meantime the reaction mixture was diluted with about 120 ml of water. The mixture was then stirred at 50° C. for 3 hours. The result obtained was a slightly cloudy solution.

EXAMPLE 2

A flask equipped with stirrer, thermometer and dropping funnel was charged with a solution of 13.1 g of N-(3-aminopropyl)imidazole in 50 ml of fully demineralized water. 8.6 g of 36.5% strength aqueous formaldehyde solution were added dropwise with heating to 40° C.

This reaction solution was in turn added dropwise at 40° C. over 2 hours to 15 g of an aqueous polyvinylamine solution (amine number: 6.96 mmol/g). The mixture was subsequently stirred for 1 hour. The result obtained was a clear solution having a viscosity of 1.2 mPas.

EXAMPLE 3

A flask equipped with stirrer, thermometer and dropping funnel was charged with 58 g of 5% strength aqueous formaldehyde solution. 50 ml of water were added for dilution, followed by 20 g of an aqueous polyvinylamine solution (amine number: 6.96 mmol/g) at not more than 40° C. The mixture was subsequently initially stirred at 40° C. for 1 hour and then at not more than 80° C. for a further hour. The result obtained was a clear solution.

EXAMPLE 4

A flask equipped with stirrer, thermometer and dropping funnel was charged with a solution of 5 g of n-butyraldehyde and 1 g of p-TSS in 10 g of MeOH. After dilution with 80 ml of water, 20 g of an aqueous polyvinylamine solution (amine number: 6.96 mmol/g) were added dropwise at room temperature. Warming to 65° C. was followed by stirring for 1.5 hours. After cooling down, the solution was adjusted to pH 10.5 with sodium hydroxide solution and subsequently stirred for 1 hour. The solution, initially concentrated by about 50% under reduced pressure, was brought with water back up to its original volume. The result obtained was a cloudy solution having a viscosity of 4.8 mPas.

EXAMPLE 5

A flask equipped with stirrer, thermometer and dropping funnel was charged with a solution of 5 g of n-butyraldehyde in 10 g of MeOH. After dilution with 80 ml of water, 20 g of an aqueous polyvinylamine solution (amine number: 6.96 mmol/g) were added dropwise at room temperature. Warming to 65° C. was followed by stirring for 1.5 hours. The solution, initially concentrated by about 50% under reduced pressure, was brought with water back to its original volume. The result obtained was a clear solution having a viscosity of 5.7 mPas.

EXAMPLE 6

A flask equipped with stirrer, thermometer and dropping funnel was charged with 61.8 g of 7% strength aqueous formaldehyde solution and 0.1 g of p-TSS. After dilution with 50 ml of water, 20 g of an aqueous polyvinylamine solution (amine number: 6.96 mmol/g) were added dropwise at not more than 40° C. This was followed by stirring at 40° C. for 1 hour. The result obtained was a cloudy solution having a viscosity of 2.9 mPas.

EXAMPLE 7

A flask equipped with stirrer, thermometer and dropping funnel was charged with 20.0 g of an aqueous polyvinylamine solution (amine number: 6.96 mmol/g). 5.7 g of 36.5% strength aqueous formaldehyde solution were added dropwise at room temperature and the mixture was subsequently stirred at 40° C. for 15 minutes. After dilution with 50 ml of water, 54.2 g of a 7.7% strength aqueous ethanolamine solution were added dropwise, which was followed by stirring at 40° C. for 1.5 hours. The result obtained was a clear solution whose pH was adjusted to 8 with acetic acid. Viscosity: 5.1 mPas.

EXAMPLE 8

A flask equipped with stirrer, thermometer and dropping funnel was charged with 20.0 g of an aqueous polyvinylamine solution (amine number: 6.96 mmol/g), 9 g of N-aminoethylethyleneurea and 0.1 g of p-TSS, followed by 100 ml of fully demineralized water. 11.4 g of 36.5% strength aqueous formaldehyde solution were metered in at 40° C., which was followed by stirring for 1.5 hours. The result obtained was a cloudy solution.

EXAMPLE 9

A flask equipped with stirrer, thermometer and dropping funnel was charged with 20.0 g of an aqueous polyvinylamine solution (amine number: 6.96 mmol/g), 4.8 g of 25% strength aqueous ammonia solution and 0.1 g of p-TSS, followed by 100 ml of fully demineralized water. 11.4 g of 36.5% strength aqueous formaldehyde solution were metered in at 40° C., which was followed by stirring for 1.5 hours. The result obtained was a cloudy solution having a viscosity of 9.1 mPas.

EXAMPLE 10

A flask equipped with stirrer, thermometer and dropping funnel was charged with 20.0 g of an aqueous polyvinylamine solution (amine number: 6.96 mmol/g), 4.2 g of ethylenediamine and 0.1 g of p-TSS, followed by 100 ml of fully demineralized water. 11.4 g of 36.5% strength aqueous formaldehyde solution were metered in at 40° C., which was followed by stirring for 1.5 hours. The result obtained was a cloudy solution.

EXAMPLE 11

A flask equipped with stirrer, thermometer and dropping funnel was charged with 20.0 g of an aqueous polyvinylamine solution (amine number: 6.96 mmol/g), and 0.1 g of p-TSS, followed by 200 ml of fully demineralized water.

10.1 g of 40% strength aqueous glyoxal solution were metered in at room temperature, which was followed by stirring initially at 40° C. for 1.5 hours and then at 60° C. for 1 hour. The result obtained was a cloudy solution having a viscosity of 4.7 mPas, measured at a shear rate of 59.5 s$^{-1}$.

EXAMPLE 12

A flask equipped with stirrer, thermometer and dropping funnel was charged with 20.0 g of an aqueous polyvinylamine hydrochloride solution (amine number: 3.28 mmol/g), followed by 30% strength aqueous potassium hydroxide solution to set pH 5. 5.4 g of 36.5% strength aqueous formaldehyde solution were metered in at 40° C., which was followed by stirring for 1.5 hours. Then 30% strength potassium hydroxide solution was added to adjust the pH to 9. The result obtained was a clear solution having a viscosity of 2.9 mPas.

EXAMPLE 13

A flask equipped with stirrer, thermometer and dropping funnel was charged with 60.3 g of 6.2% strength formaldehyde solution. After dilution with 50 ml of water, 20 g of an aqueous polyvinylamine solution (amine number: 6.96 mmol/g) were added dropwise at not more than 40° C. This was followed by stirring initially at 40° C. for 1 hour and then at not more than 80° C. for a further hour. The result obtained was a slightly cloudy solution having a viscosity of 1.6 mPas.

Use examples

Washing trials

To test the effectiveness, white cotton test fabric (weight: 2.50 g) was washed in a Launder-O-meter together with dyed cotton textiles. The staining was measured photometrically. The reflectance values measured for the individual test fabrics were used to determine the respective color strengths, from which the effectiveness of the in-test polymers can be derived. An effectiveness of 100% means that the test fabric retains its original color strength; that is, that it was not stained.

An effectiveness of 0% is found for a test fabric washed without addition of a dye transfer inhibiting additive.

The cotton pieces used in the wash had been dyed in such a way that a 5 g swatch stained the white test material to a color strength 100 in the case of direct dyes and to a color strength from 30 to 40 in the case of reactive dyes. These color strengths allow the best judgement of the effectiveness of the additives.

TABLE 1

| Dyeing with | Constitution number |
|---|---|
| 0.3% of C.I. Direct Red 81 | 28160 |
| 1.0% of C.I. Direct Orange 39 | 40215 |
| 3.0% of C.I. Direct Black 22 | 35435 |
| 3.9% of C.I Direct Blue 218 | 24401 |
| 8.0% of C.I. Reactive Black 5 | 20505 |
| 4.0% of C.I. Reactive Red 158 | — |

Washing Conditions

| | |
|---|---|
| Washing apparatus | Launder-O-meter (from Atlas, Chicago, Illinois) |
| Wash cycles | 1 |
| Temperature | 60° C. |
| Washing time | 30 min |
| Water hardness | 3 mmol/l; Ca$^{2+}$:Mg$^{2+}$:HCO$_3$ (4:1:8) |
| Test fabric | cotton |
| Liquor quantity | 250 ml |
| Detergent concentration | 5.0 g/l |
| Detergent composition [%] | |
| Zeolite | 27.50 |
| Sodium carbonate | 15.00 |
| Dodecylbenzenesulfonate | 7.00 |
| Soap | 1.75 |
| C$_{13}$/C$_{15}$ Oxo alcohol × 7 ethylene oxide units | 5.40 |
| Acrylic acid/maleic acid copolymer 70/30, Sodium salt, molecular weight 70000 | 3.75 |
| Sodium carboxymethylcellulose | 0.60 |
| Water | 9.85 |
| Color transfer inhibitor as per Table 2 | 1.00 |
| Sodium sulfate | to 100 |

COMPARATIVE EXAMPLE

Polyvinylpyrrolidone, K value 30 (1% strength in water) was tested as standard polymer to provide a comparison with the above-described detergent composition. Polymers of this kind are present as color transfer inhibitors in commercial detergents.

TABLE 2

| Example | Colour transfer inhibitor as per Example | Direct Red 81 | Direct Orange 391 | Direct Black 22 | Direct Blue 218 | Reactive Black 5 | Reactive Red 159 |
|---|---|---|---|---|---|---|---|
| 14 | 1 | 13 | 36 | 78 | 55 | 21 | 32 |
| 15 | 2 | 18 | 39 | 77 | 56 | 26 | 38 |
| 16 | 3 | 11 | 21 | 71 | 79 | 21 | 33 |
| 17 | 4 | 34 | 74 | 79 | 95 | 25 | 53 |
| 18 | 5 | 27 | 71 | 78 | 96 | 21 | 50 |
| 19 | 6 | 11 | 19 | 73 | 36 | 20 | 31 |
| 20 | 7 | 5 | 0 | 48 | 82 | 24 | 33 |
| 21 | 8 | 15 | 19 | 77 | 31 | 22 | 32 |
| 22 | 9 | 11 | 26 | 83 | 71 | 24 | 44 |
| 23 | 10 | 4 | 17 | 76 | 58 | 19 | 39 |
| 24 | 11 | 6 | 11 | 73 | 79 | 38 | 28 |
| 25 | 12 | 2 | 0 | 67 | 81 | 29 | 44 |
| 26 | 13 | 13 | 41 | 87 | 89 | 36 | 47 |
| Comp. Ex. | | 0 | 14 | 57 | 26 | 16 | 32 |

The results show that the products of Examples 1 to 13 to be used according to the invention equal the effectiveness of polyvinylpyrrolidone in about 90% of the cases and in some cases very distinctly exceed it.

We claim:

1. A detergent comprising a surfactant, optionally a builder, and from 0.05 to 10% by weight of polymers which are prepared by reaction of
   (a) polymers that contain vinylamine units, with
   (b) compounds that contain aldehyde or keto groups, and optionally
   (c) other NH- and/or OH-containing compounds and which contain aminal, hemiaminal and/or aminal-acetal structures with or without unconverted vinylamine units.

2. The detergent as claimed in claim 1, wherein the polymers (a) comprise
   (1) from 0.1 to 100 mol % of vinylamine units and
   (2) from 99.9 to 0 mol % of units of other monoethylenically unsaturated monomers and
   (3) from 0 to 5 mol % of units of monomers having at least two ethylenically unsaturated nonconjugated double bonds.

3. The detergent as claimed in claim 1, wherein the polymers (a) comprise
   (1) from 1 to 99 mol % of vinylamine units and
   (2) from 99 to 1 mol % of units of monomers selected from the group consisting of open-chain N-vinylcarboxamides, vinyl acetate, vinyl propionate, $C_1$–$C_6$-alkyl vinyl ethers, vinylureas, acrylic acid, methacrylic acid, maleic acid and the anhydrides, esters, nitriles and amides of said carboxylic acids, N-vinylpyrrolidone, N-vinylimidazoles, N-vinylimidazolines, vinyl alcohols and mixtures thereof.

4. The detergent as claimed in claim 1, wherein the polymers (a) comprise
   (1) from 0.1 to 100 mol % of vinylamine units and
   (2) from 99.9 to 0 mol % of N-vinylformamide, vinyl acetate and/or vinyl alcohol units.

5. The detergent as claimed in claim 1, wherein the compounds (b) used are monoaldehydes, dialdehydes, hydroxyaldehydes, alkoxyaldehydes, ketoaldehydes, aldehydecarboxylic acids, aldehydecarboxylic esters, aldehydecarboxamides, ketones, hydroxyketones and/or alkoxyketones.

6. The detergent as claimed in claim 1, wherein NH-containing compounds (c) are selected from the group consisting of ammonia, amines, etheramines, aminoalcohols, aminoether alcohols, carboxamides, carboximides, ureas, NH-containing heterocycles, alcohols, ether alcohols and polyalkylene glycols.

7. A polymer containing aminal, hemiaminal and/or aminal-acetal structures, obtained by reaction of
   (a) polymers that contain vinylamine units, with
   (b) compounds that contain aldehyde or keto groups, and
   (c) other NH- containing compounds.

8. The polymer as claimed in claim 7, obtained by reaction of
   (a) polymers which comprise
      (1) from 0.1 to 100 mol % of vinylamine units,
      (2) from 99.9 to 0 mol % of units of monomers selected from the group consisting of open-chain N-vinylcarboxamides, vinyl acetate, vinyl propionate, $C_1$–$C_6$-alkyl vinyl ethers, vinylureas, acrylic acid, methacrylic acid, maleic acid and the anhydrides, esters, nitriles and amides of said carboxylic acids, N-vinylpyrrolidone, N-vinylimidazoles, N-vinylimidazolines, vinyl alcohols and mixtures thereof with
   (b) aldehydes having from 1 to 5 carbon atoms and
   (c) ammonia, ethanolamine, ethylenediamine and/or N-(3-aminopropyl)imidazole.

9. A detergent composition, comprising a surfactant and 0.05–10% by weight of the polymer of claim 7.

* * * * *